OR    3,980,398

United States
von Belvárd

[11]  3,980,398
[45]  Sept. 14, 1976

[54] ZOOM OBJECTIVE

[75] Inventor: Peter Révy von Belvárd, Vienna, Austria

[73] Assignees: Earl Vockenhuber; Raimund Hauser, both of Vienna, Austria

[22] Filed: Nov. 12, 1973

[21] Appl. No.: 414,848

[30] Foreign Application Priority Data
Nov. 13, 1972   Austria .................. 9624/72

[52] U.S. Cl. ............................ 350/187; 350/255
[51] Int. Cl.² .................... G02B 15/00; G02B 7/02
[58] Field of Search .......... 350/184, 186, 187, 255

[56] References Cited
UNITED STATES PATENTS

| | | | |
|---|---|---|---|
| 2,026,724 | 1/1936 | Wallensak | 350/255 |
| 2,080,172 | 5/1937 | Fishe | 350/255 |
| 3,731,987 | 5/1973 | Iida et al. | 350/255 |

*Primary Examiner*—John K. Corbin
*Assistant Examiner*—Conrad Clark
*Attorney, Agent, or Firm*—Ernest G. Montague; Karl F. Ross; Herbert Dubno

[57] ABSTRACT

A zoom lens assembly has a normal-range finder which is operable at all settings of a macro-range finder. The normal-range finder produces relative movement between two lens elements one of which is also positionable by the macro-range finder. This is achieved in one arrangement by controlling the positions of the lens elements with two coaxially arranged tubes which are coupled together for rotational movement but which can be moved axially with respect to one another by the macro-range finder. In another arrangement a single control tube is used to shift the two lens elements in response to adjustment of the normal-range finder but one of the lens elements is also displaceable within the control tube by rotation of a threaded mounting cylinder.

3 Claims, 2 Drawing Figures

ZOOM OBJECTIVE

FIELD OF THE INVENTION

This invention relates to a zoom lens assembly having an optical axis, two spaced lens elements movable along the axis, and a control mechanism including tribe means rotatable about that axis by a normal-range finder to produce simultaneous movement along the axis of both lens elements, via respective camming formations accompanied by a change in the spacing between them.

STATE OF THE ART

It has been proposed to provide a zoom assembly with a macro-range finder in addition to the normal-range finder. However, such proposals have not provided a way of allowing the normal-range finder to be used throughout the range of the macro-range finder.

OBJECT OF THE INVENTION

An object of the invention is to provide a zoom lens assembly with the normal-range finder which is usable throughout the range of settings of a macro-range finder.

SUMMARY OF THE INVENTION

I realize the above object, in accordance with the present invention, by the provision of actuating self-locking means coupled with one of the two movable lens elements for axially shifting same independently of the other movable lens element into a selected macro-range position enabling concurrent displacement of both lens elements by the common control mechanism from a relative axial position thereof preselected by the actuating means.

More particularly, where the tube means comprises a pair of relatively axially displaceable cylinders linked for joint rotation by suitable coupling means, each of these cylinders being provided with one of the camming formations for a respective lens element, the actuating means according to my invention may comprise a lever pivotable about a swing axis transverse to the optical axis; a self-arresting eccentric on the lever, pressing upon one of the cylinders preferably through an antifriction bearing and against an elastic restoring force, then acts as a backstop to hold the selected macro-range position.

Alternatively, with a single control cylinder carrying both camming formations, the actuating means may comprise a mounting cylinder for one of the lens elements connected with the corresponding camming formations through a threaded coupling enabling axial displacement of that lens element relative to the control cylinder upon rotation of the mounting cylinder. In this instance I prefer to maintain the selected macro-range position by a detent mechanism, such as a pawl-and-ratchet assembly, whose release enables a return of the mounting cylinder to a normal position by the action of a restoring spring.

BRIEF DESCRIPTION OF THE DRAWING

The above and other features of my invention will now be described in detail with reference to the accompanying drawing in which.

FIRST EMBODIMENT

Figure 1:
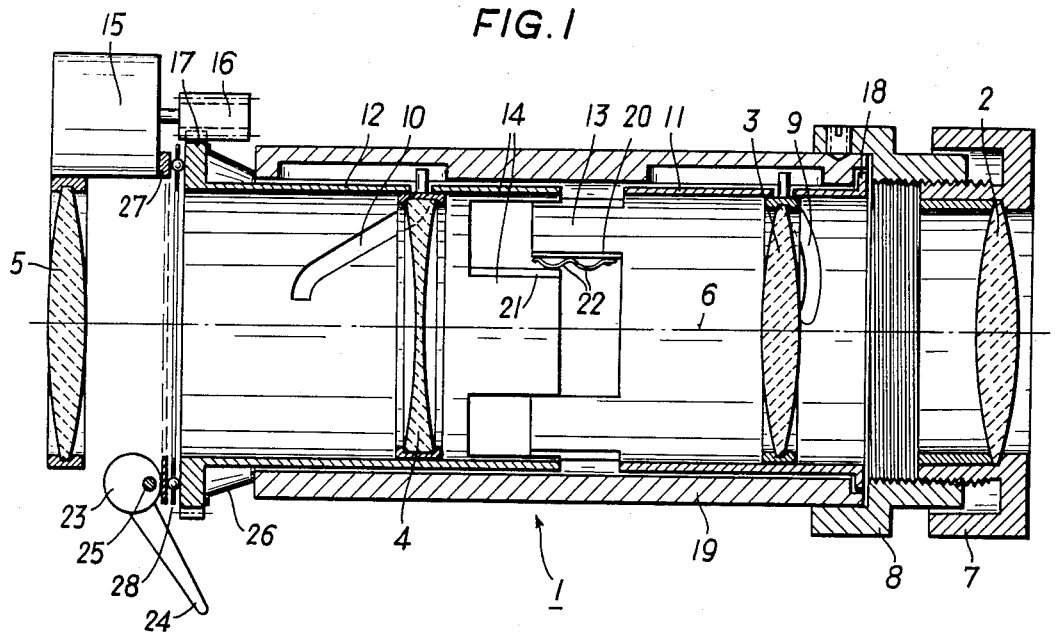
FIG. 1 is a diagrammatic cross-section through a zoom lens assembly embodying my invention.

A zoom objective 1 shown in FIG. 1 comprises four lens elements 2, 3, 4 and 5, which are each indicated for convenience by a single lens and of which the front lens 2 is adapted to slide in a tube 8 along the optical axis 6 by rotating an associated threaded socket part 7. The rear lens 5 is stationary and not slidable. The associated retaining parts for the rear lens 5 are of known construction and are therefore not shown in detail. The two middle lenses 3, 4 on the other hand are axially slidable according to two different laws of motion and are controlled to this end by respective curved camming slots 9, 10.

The camming slots 9, 10 are cut into respective coaxially arranged cylinders 11, 12 of like radius which are rotatable about an optical axis 6 and have intermeshing coupling fingers 13, 14. The two guide cylinders 11, 12 are rotationally coupled by the fingers 13, 14 but are axially slidable with respect to each other. A gear rim 17 of the guide cylinder 12 is arranged to be driven by a motor 15 via a pinion 16 and the intermeshing fingers 13, 14 ensure that the cylinder 11 co-rotates so as to provide the desired change of focal length by simultaneous axial movement of both lenses 3 and 4. The guide cylinder 11 is retained against axial movement by a collar 18 trapped between the tube member 8 and a surrounding tube 19. The guide cylinder 12 is, however, slidable with respect to the cylinder 11 as is explained below. In order to compensate for tolerances and to ensure that the two camming slots 9, 10 are always accurately coordinated with each other, the two guide cylinders 11, 12 are provided with lugs 20 or 21 respectively which extend along the edges of each of their coupling fingers 13 or 14 and are bent radially inwards towards the optical axis 6. The lug 20 is provided with leaf springs 22 which bear upon the lug 21 in the peripheral direction and thus retain the coupling fingers 13, 14 in a fixed angular position so as to eliminate any angular play existing between the two cylinders.

An eccentric 23 controlled by a hand lever 24 is provided for the axial displacement of the guide cylinder 12. The eccentric 23 is pivotable about a stationary serving axis 25, transverse to optical axis 6 and exerts a thrust on a flange which is associated with the guide cylinder 12 and supports the rim 17. One end of a diaphragm spring 26 bears on the other side of the flange, the other end of the diaphragm spring bearing on the tube 19. The diaphragm spring 26 therefore thrusts the guide cylinder 12 towards one limiting position which is defined by a stop abutment 27, fixed with respect to the apparatus when the eccentric 23 is in an inoperative position, the stop abutment cooperating with a ball-bearing cage 28 which is mounted on the guide cylinder 12.

OPERATION OF FIRST EMBODIMENT

If the handle 24 is rotated about the axis 25 in the clockwise direction the external surface of the eccentric 23 displaces the guide cylinder 12 together with lens 4 to the right against the action of the diaphragm spring 26. No change in the preset lens position by the thrust of the diaphragm spring 26, after the hand lever 24 is released can occur because the eccentric 23 is substantially self-arresting. Nevertheless, the motor 15 can be operated in any desired position of the eccentric 23 so that an adjustment of the focal length is possible with any setting of the lens 4. The hand lever 24 functions as a macro range finder.

SECOND EMBODIMENT

Figure 2:
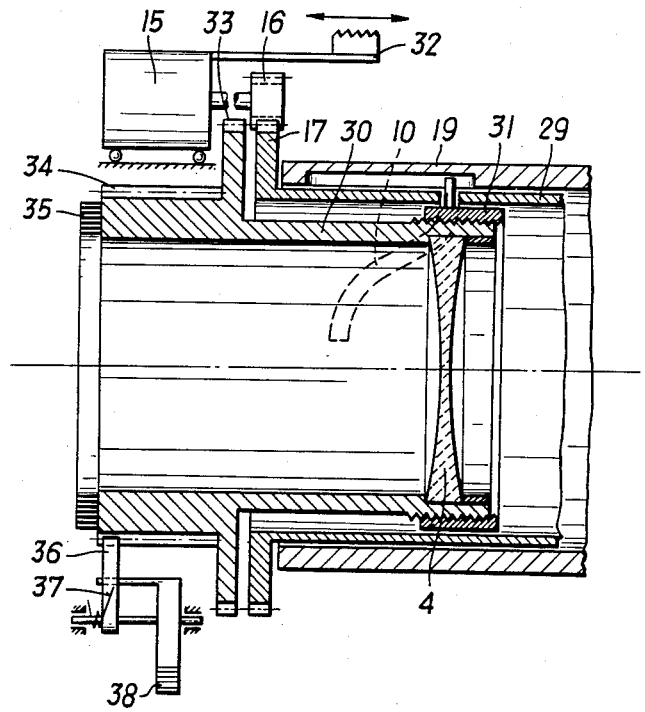
FIG. 2 is a diagrammatic cross-section through an alternate embodiment.

In FIG. 2, parts with the same functions as in FIG. 1 have the same reference numerals. Here, only one control cylinder 29 is provided, in place of two separate control cylinders, and is formed with camming slots 9 and 10 (slot 9 being not visible in this view). To permit individual axial displacement of the lens 4 it is disposed in a mounting cylinder 30 which is separated from the control cylinder 29 and is threadedly received in a coupling sleeve 31 which engages the camming slot 10. Rotating the mounting cylinder 30 in the coupling sleeve 31 therefore enables the distance setting to be altered in the sense of a macro adjustment. The motor 15 is slidably supported in order to permit motor-driven adjustments to be performed in the macro range and the motor can be slid by means of an adjusting lever 32 so that the pinion 16 cooperates optionally with the gearing 17 of the control cylinder 29 for adjusting the focal length, and with a gearing 33 of the mounting cylinder 30 for macro-range adjustment. The cylinder 30 is also provided with ratchet teeth 34 and a spiral spring 35. Rotating the cylinder 30 causes the spiral spring 35 to be tensioned but the spring is prevented from running down by a pawl 36 which cooperates with the ratchet teeth 34 and has a button control 38. The pawl 36 engages with the tooth system 34 render the action of a hairpin spring 37.

OPERATION OF SECOND EMBODIMENT

If an adjustment over the normal range is desired after an adjustment has been effected in the macro range, the button 38 is operated which disengages the pawl 36 whereupon the lens 4 returns under the action of the spiral spring 35 into a predefined position relative to the element 3 so that the range finder 7 with the lens 2 (FIG. 1) again becomes effective. This permits rapid "fading" from a macro setting into a normal setting. Rotation of the gearing 33 by the motor 15 produces macro-range adjustment as it alters only the position of the lens 4, and rotation of the gearing 17 in any position of the lens 4, when the mounting cylinder 30 is held against further rotation by the pawl 36, produces simultaneous axial movement of both lenses 4 and 3 to provide a normal-range setting.

MODIFICATIONS

The mounting cylinder 30 may be driven by a self-arresting transmission, for example a worm. Other forms of drive are also possible. It is merely essential that direct control of the two lenses 3, 4 which are slidable in relation to each other is performed in each case by another guide part to permit axial displacement of at least one lenses although the lens are coupled to each other for normal-range setting.

I claim:
1. In a zoom lens assembly, in combination:
 a first and a second lens element individually shiftable along an optical axis;
 a control mechanism including a first and a second rotatable cylinder of like radius centered on said optical axis and provided with first and second camming formations engaged by said first and second lens elements, respectively, for axially displacing said lens elements upon rotation of said cylinders, said cylinders having adjacent ends provided with intermeshing fingers linking same for joint rotation while enabling their relative axial displacement; and
 actuating means coupled with said first cylinder for axially shifting said first cylinder independently of said second cylinder to preset said first lens element to a selected starting position relative to said second lens element.

2. The combination defined in claim 1, further comprising resilient means inserted between adjacent fingers for eliminating any angular play therebetween.

3. In a zoom lens assembly, in combination:
 a first and a second lens element individually shiftable along an optical axis;
 a control mechanism including a first and a second rotatable cylinder centered on said optical axis and provided with first and second camming formations engaged by said first and second lens elements, respectively, for axially displacing said lens elements upon rotation of said cylinders, said cylinders being provided with coupling means linking said cylinders for joint rotation while allowing relative axial movement thereof;
 peripherally effective resilient means interposed between said cylinders for eliminating any angular play therebetween; and
 actuating means coupled with said first cylinder for axially shifting said first cylinder independently of said second cylinder to preset said first lens element to a selected starting position relative to said second lens element.

* * * * *